Nov. 7, 1944.  F. HUNZIKER  2,362,072

INDEXING CHUCK

Filed Oct. 15, 1943  3 Sheets-Sheet 1

INVENTOR
FRED HUNZIKER
BY
George M. Soule
ATTORNEY

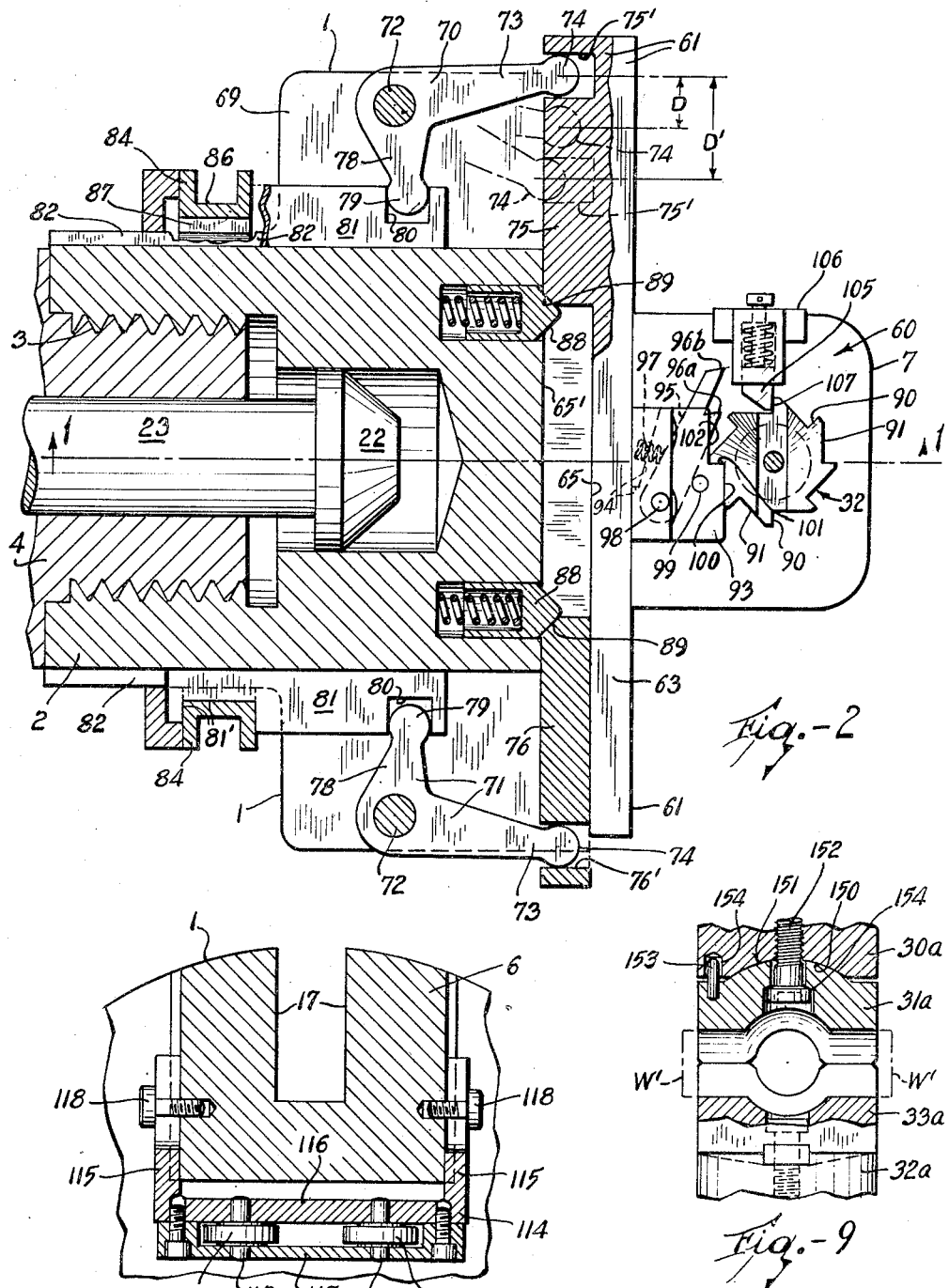

Nov. 7, 1944.   F. HUNZIKER   2,362,072
INDEXING CHUCK
Filed Oct. 15, 1943   3 Sheets-Sheet 3

INVENTOR
FRED HUNZIKER
BY George M. Soule
ATTORNEY

Patented Nov. 7, 1944

2,362,072

UNITED STATES PATENT OFFICE 2,362,072

INDEXING CHUCK

Fred Hunziker, Cleveland, Ohio, assignor of one-half to The W. J. Schoenberger Company, Cleveland, Ohio, a corporation of Ohio Application October 15, 1943, Serial No. 506,414

23 Claims. (Cl. 279—5)

This invention relates to a chuck mechanism on the order of that shown in my prior application Serial No. 479,760, filed March 17, 1943. Said prior application shows a non-stop indexing chuck wherein provision is made to demountably secure work coaxially of the main rotating head of the chuck and, while so secured and while the chuck is rotating, to index the work to various positions depending upon the number of locations on the work to be machined or otherwise operated upon. The chuck is arranged for application for example to turret lathes wherein different tools can be presented to the work upon indexing of the tool carrying turret to different positions in accordance with the instantaneous position of the work on the indexable work supporting assembly of the chuck. Also, in common with said application, the present arrangement provides for opening the work receiving jaws of the chuck as by movement of at least one of the jaws by means extending through a hollow spindle of the machine tool on which the chuck is mounted for operation.

The principal objects of the present invention are to provide a chuck mechanism having one or more of the following features; (1) an improved means for operating the chuck to work receiving and gripping position as by relatively spreading and then bringing together a pair of work gripping jaws; (2) an improved cam and push rod mechanism for enabling work to be accommodated in the chuck in centered position notwithstanding variation of the pieces in at least one dimension, which mechanism is also capable of resiliently limiting the gripping force which may be applied to the work; (3) an improved means for operating oppositely acting self-balancing slides, either one of which may be arranged to index a work holding spindle assembly and the other one of which may be used only for balancing or may have additional functions such as providing a buttressing support for a head portion of one of the relatively separable work supporting spindles or a portion which overhangs a fixed bearing for the spindle; (4) an improved buttressing support such as just mentioned; (5) an improved work holder for a non-stop indexing chuck whereby individual pieces may have a certain variation in at least one dimension and be properly secured in centered position in respect to the tool or tools; (6) an improved means for urging the work gripping jaws relatively apart for receiving work between them which improved means may be easily adjusted to vary the operating force.

A further object is to provide a non-stop indexing chuck having an improved indexing means capable of angularly adjusting the work through different angles about the work holding spindle axis and wherein in each indexed position when the indexing operation is completed the work is locked against any possibility of rotary movement out of position.

A further object is to provide a non-stop indexing chuck having a pair of balancing slides, one of which effects indexing of the work and wherein the entire construction adjacent the region in which work is performed is closed against the entrance of foreign matter such as chips, dirt and the like.

A still further object is to provide an improved work supporting jaw mechanism for an indexing chuck.

Other objects and features of the invention will become apparent from the following description wherein reference is made to the drawings showing an illustrative embodiment.

In the drawings:

Fig. 2 is a similar generally central sectional view taken at right angles to Fig. 1 as indicated by the line 2—2 on Fig. 1;

Figure 1:
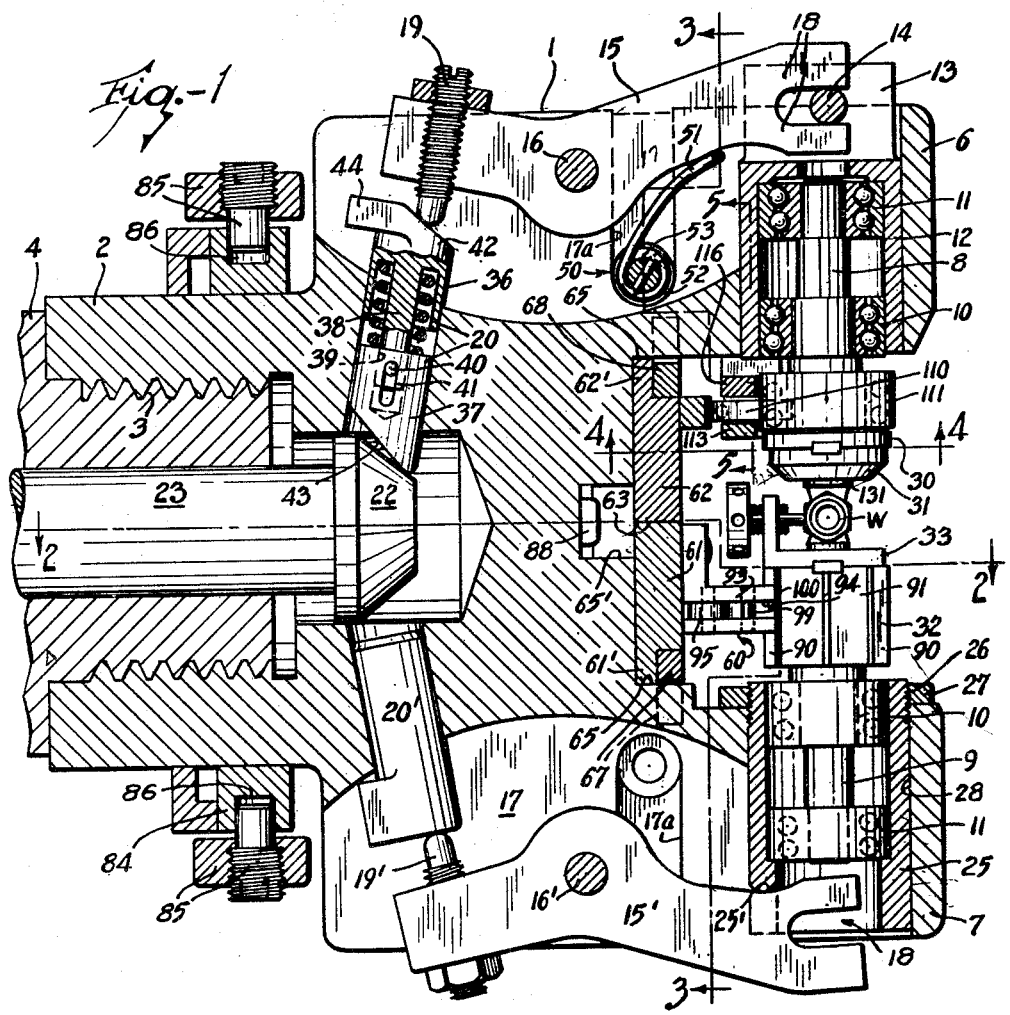
Fig. 1 is a longitudinal central sectional assembly view of the chuck.
Figure 4:
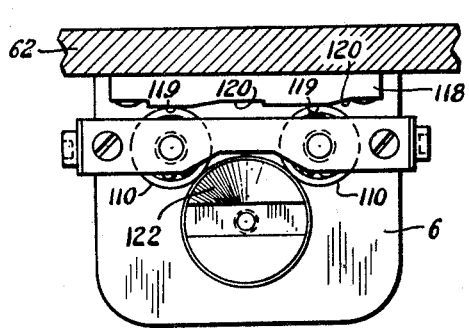
Figure 8:
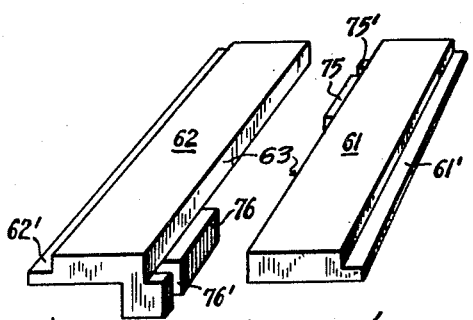
Figure 6:
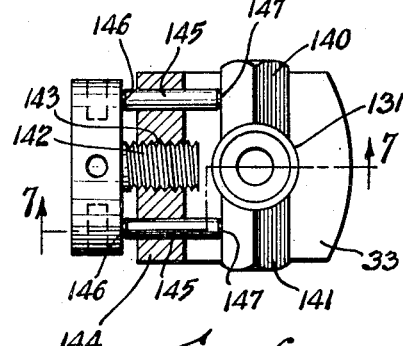
Figure 7:
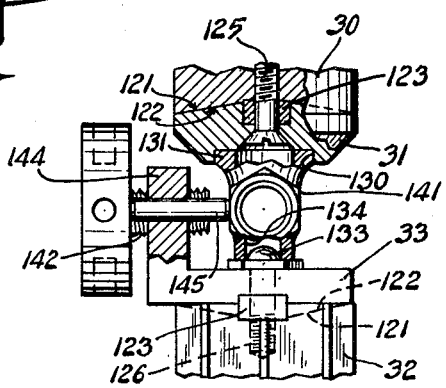

Figs. 4 and 5 are detail sectional assembly views as indicated by the lines 4—4 and 5—5 on Fig. 1;

Fig. 6 is a relatively enlarged transverse sectional view of the work holding jaw construction shown in Figs. 1 and 2 and as indicated by the line 6—6 on Fig. 1;

Fig. 7 is a similarly enlarged central sectional view of the jaw constrution taken in a plane generally corresponding to that of Fig. 1;

Fig. 8 is an exploded perspective view showing a pair of slides; and

Fig. 9 is a longitudinal central sectional detail view of a modified work gripping jaw mounting.

The chuck has a main, generally cylindrical, body 1 having a rearward shank portion 2 of reduced diameter provided with coarse internal screw threads at 3 by which the chuck may be removably secured to a hollow spindle of a turret lathe, a small forward portion of which is shown at 4. The head 1 has two parallel extensions of generally similar form, indicated at 6 and 7, which constitute brackets for supporting a pair of spindles 8 and 9 in coaxial spaced relationship on respective sides of the center of rotation of the chuck and lathe spindle. The brackets may be integral with the head (as shown) or made as separate parts adjustably mounted on the head for movement toward and away from each other.

The spindles 8 and 9, as shown, are supported in inwardly and outwardly disposed antifriction bearing units indicated respectively at 10 and 11. The bearing assembly of the spindle 8 is carried centrally in a sleeve-like plunger 12 having a radially outwardly slotted end portion 13 bridged by a pin 14 for enabling a rocker lever 15 to move the spindle 8 inwardly and outwardly with reference to the center of the chuck. The rocker lever 15 has a fixed pivot pin 16 on the head 1 and is guided in a radial but axially extending slot or channel 17 in the head across which the pin 16 extends to support the lever. The forward end of the lever is forked at 18 slidably to embrace the pin 14 of the spindle plunger 12 and the rearward end of the lever carries an adjustable abutment screw 19 shown with an inner rounded end bearing against a radially outward beveled end surface 42 of a push rod 20. The push rod extends obliquely rearwardly from the tail end of the lever but generally radially and its inner beveled end surface 43 bears against a frusto-conical cam 22 centrally of the chuck and carried on a bar 23 extending rearwardly through the hollow spindle 4 to operating means such for instance as a plunger of a suitable piston and cylinder mechanism adapted to be operated by fluid such as air under the control of the operator. The piston-cylinder mechanism may be substantially according to my prior Patent No. 1,801,601 issued April 21, 1931.

The spindle 9 and its bearing assembly 10—11, in the illustrative form shown, are supported in a sleeve 25 in the bracket 7. For slight adjustment the inner end of the sleeve may be threaded as at 26 for engagement by an adjusting ring nut 27 bearing outwardly against the radially inward face of the bracket 7. The sleeve 25 slidably fits a cylindrical bore 28 in the bracket 7 and may be held in place by a set screw (not shown) at one side of the bracket. In event both spindles are desired to be moved to open and close the chuck then the sleeve 25 is replaced by a plunger 12 identical with that shown in Fig. 1. In either case it is desirable approximately to balance the chuck and that may easily be done by mounting an idle rocker lever and push rod assembly as at 15', 20'. The sleeve 25 is slotted at one side as at 25' to receive the forked forward end of the idle rocker lever. The dummy push rod has a head portion to retain it out of contact with the cam 22 and the screw 19' is tightly seated against said head portion.

The cam 22 is shown in position in which the push rod 20 is urged outwardly so as to move the spindle 8 into work gripping position. As shown, the spindle 8 has an enlarged cylindrical head 30 supporting a jaw member 31 and the spindle 9 has an enlarged, generally cylindrical, head 32 supporting a jaw member 33. A work piece W, in the form of a small pipe fitting, is shown as clamped between the jaw members 31 and 33 in the position of the spindle 8 shown. The jaws are readily replaceable by other jaws varying according to the character and form of the work.

When one of the work holding jaws such as the jaw 33 is fixed and opening movement of the chuck in order to receive work is accomplished solely by movement of the mating jaw, the work pieces can always be locked in centered relation to the rotational axis of the chuck by association of the work piece with the fixed jaw and, in that event, particularly where the work is of more or less delicate nature as in small thin shelled pieces, it is desirable to provide some yieldability or cushion effect between the jaw closing cam 22 and the movable jaw. It is also sometimes desirable to limit the force which the cam can apply in the jaw closing direction, thereby to avoid wear on the spindle bearings during indexing operation and also to make indexing somewhat easier.

In the present arrangement I provide for the desired yieldability in the push rod 20. The push rod, as shown, has two aligned generally cylindrical sections 36 and 37 which are telescopically connected by an axial projection 38 on the section 36 occupying a central dead end bore 39 in the section 37. In order positively to limit the push rod in its effective length the two sections are pinned together as by a cross pin 40 seated against one end of each of a pair of axial slots 41 in the section 37. The pin and slot connection holds the sections 36 and 37 against relative rotation so that the beveled surfaces 42 and 43 on the sections 36 and 37 respectively are maintained in proper operating position with respect to the cam surface 22 and set screw 19. The head portion of the section 36 is extended rearwardly as at 44 and made the same width as the slot 17 so that the extension 44 prevents the push rod 20 from turning in its bore and allowing the surfaces 42 and 43 to get out of proper operating position with respect to the cam 22 and rocker lever abutment screw 19.

The oblique or beveled abutment surfaces 42 and 43 of the push rod increase the angular movement of the rocker lever 15 with a given reciprocating motion of the cam 22 as compared, for example, to end surface formations such as shown on the push rods 15 and 15a of my said prior applications (Figs. 4 and 5 thereof) particularly when the push rod extends obliquely to the axis of rotation of the chuck and in a generally forward direction, as illustrated on Fig. 1 hereof. As the rocker lever turns in a counterclockwise direction, the inner end of the abutment screw 19 moves forwardly as it rides down the oblique surface 42, thus shortening the effective length of the tail of the rocker lever, and an effective shortening of the push rod is accomplished simultaneously by the oblique surface as the screw end moves farther from the center of the push rod. Upon clockwise movement of the rocker lever by the push rod the reverse condition obtains, so that the mechanical advantage, as the work is gripped, is gradually increased. Similarly, when the cam 22 is moved to the left and the inner end of the push rod rides over the forward end of the cam the push rod becomes, in effect, shortened where in contact with the cam. The gain in opening movement of the chuck is important in order to facilitate placement of work between the chuck jaws.

For urging the spindles 8 and 9 relatively apart the forward arm of the rocker lever 15 is forced radially outwardly by a "mouse trap" type spring 50 which has an arm in the form of a loop at 51 bearing against the inner side of the forward lever arm and coils 52 at each side of the loop anchored to a supporting pin 53 as by having the terminal portions 54 of the spring extending through diametral openings or a lengthwise slot in the pin. The pin 53 as shown is contained in a bore 55 and counterbore 56 thereof which latter intercepts the slot 17 of the head in which the rocker lever and the outer end of the arm portion of the spring are guided. The pin may be retained in position by a pinned-on end collar 57 beyond the bore 55 and a cooperating head 58 at the opposite end of the pin. The head is of such shape as to enable the pin to be turned by a wrench in order to increase the force of the spring arm portion 51 outwardly against the forward lever arm. When the spring is adjusted with the desired torsion the pin may be locked against rotation as by a set screw 59 on the head 58 bearing against an adjacent face of the head 1 or seating into one of a circular series of depressions 59' in said face, as desired.

Figure 3:
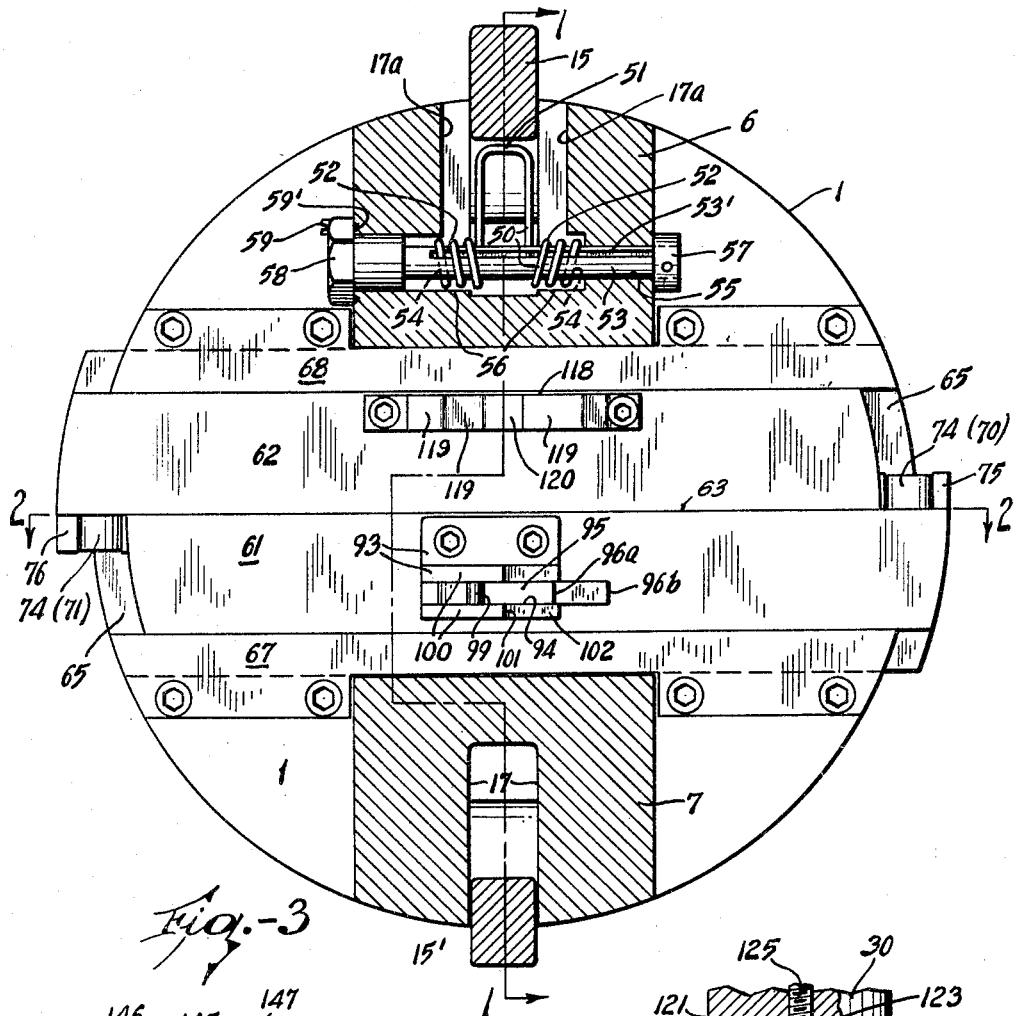
Fig. 3 is a transverse sectional and end elevational view as indicated at 3—3 on Figs. 1 and 2.

In order to assemble the rocker lever return spring mechanism of Fig. 3, the pin 53 has a diametral slot at 53' and extending past the spring coils 52 to the end of the pin on which the collar 57 is attached. Additionally, the head 1 is milled to form parallel channels as at 17a on opposite sides of the slot 17 so that the spring can readily be inserted into final position through the channels and slot 17, after which the pin 53 is inserted into the bore 55 and counterbore 56 with the side portions of the pin which define the slot 53' in retaining relationship to the free spring ends 54. The collar 57 is fastened as a final operation before winding up the spring and locking the pin in turned position.

Referring further to the work holding spindle assembly, the head portion 32 of the spindle 9 is in the form of a ratchet wheel having, for example, eight equally spaced teeth of conventional form. Instead the head can be made in the form shown at 9 in my prior application or as shown at H, Figs. 19 and 20 of my Patent No. 1,801,601. The cooperating ratchet mechanism on the indexing slide would be modified accordingly.

In the present arrangement as shown particularly by Figs. 1, 2 and 3, suitable ratchet mechanism, indicated generally at 60 and carried on one of a pair of slides 61 and 62 (61 as shown) operates to index the head 32 45° upon each complete reciprocation of the two slides 61 and 62, or, selectively as desired, 90° upon each complete reciprocation.

The slides are mounted to be guided partly by mutual contact along narrow straight mating surfaces 63 (Figs. 1 and 8) but mainly by guideways formed in part by a common rectangular channel 65 extending diametrically across the face of the chuck head between the brackets 6 and 7 at right angles to the indexing axis of the work spindle assembly. Respective rectangular slide retaining strips are shown at 67 and 68 overhanging said recess 65 and lateral tongue portions 61' and 62' of the slides. The strips 67 and 68 extend beyond the respective bracket 6 and 7 at each side thereof, being cut away centrally of the chuck to accommodate the brackets. One of the slides may have a cover plate (not shown) rigid therewith, overhanging the forward faces of both slides for substantially their entire length. However, as will be apparent from Figs. 3 and 8, the slides can be made as identical single pieces which cooperate to fully close the central front face of the chuck clear across the head 1 to exclude chips and dirt. The slide 61 has on one end a rearwardly extending parallel sided rib or block portion 75 fitting one end of an associated rearwardly disposed central depressed channel portion 65' of the channel 65, said rib extending equal distances on opposite sides of the plane of the matching slide surfaces 63, and the slide 62 has a similar end block or rib portion 76 but at the opposite end of the slide 62, diametrally of the chuck head. The ribs 75 and 76 assist the retainer strips in holding the slides in parallel free sliding position at all times.

For operating the slides 61 and 62 simultaneously in opposite directions, a rack and pinion arrangement similar to that shown in application Serial No. 488,171, filed May 24, 1943, by George M. Soule, may be used but, in order to enable simpler adjustment of the operating throw of the slides, as in special cases, I prefer to provide bell cranks as shown in Fig. 2 at 70 and 71 supported respectively in parallel diametrally open milled slots 69 in the head 1 as on respective pivot pins 72 crossing the slots 69. Forwardly extending, generally parallel, arms 73 of the bell cranks have generally cylindrical terminal members 74 slidably and snugly received in slots 75' and 76' of the ribs or end blocks 75 and 76 respectively.

The radially extending arms 78 of the bell cranks 70 and 71 have cylindrically shaped ends 79 lying in oppositely facing rectangular notches 80 of shifter bars 81 which are slidably seated in parallel diametrally opposite channel grooves 82 formed as rearward continuations of the slots 69 and constituting keyways extending to the rearward end of the cylindrical shank 2 of the head 1. Connecting the two shifter bars 81 is a shipper ring 84 which encircles the shank 2 in axially sliding contact therewith and the shipper ring lies in radial notches 81' of the shifter bars (one notch shown at lower left, Fig. 2) to enable said bars to be controlled by an ordinary shipper yoke. Only the terminal portions 85 of the shipper yoke are shown in Fig. 1 extending into the circumferential groove 86 of the shipper ring. The ring 84 has opposite internal keyway slots 87 the same width (circumferentially) as the shifter bars 81 adjacent the radial notches 81' so that the shifter bars act as keys to secure the shipper ring against rotation on the shank 2.

The two slides 61 and 62 are shown in relatively outwardly shifted position in Fig. 2 in which position they tend to be maintained by centrifugal force, being overbalanced outwardly from the rotation axis of the chuck. This relative position of the two slides 61 and 62 is the position in which the work supporting spindle assembly is locked against rotation. Supplementing such centrifugal force on the slides, each slide may have a spring detent shown in the form of spring pressed plungers 88, the nose portions of which releasably abut beveled end portion 89 of the ribs 75 and 76 respectively.

Referring to the indexing and locking mechanism shown particularly by Figs. 1 and 2, the ratchet teeth on the head 32 of the spindle 9 are formed by radial shoulder surfaces 90 and adjacent sloping more or less tangentially extending surfaces 91 formed on the head 32. A ratchet pawl carrier is shown in the form of a bracket 93 mounted on the slide 61 as by suitable screws and, if desired, being capable of adjustment crosswise of said slide and parallel to the indexing axis of the spindles. The bracket 93 has an open slot 94 which receives a pawl 95 and the nose portion (e. g.) 96a of the pawl is urged toward the ratchet teeth as by a spring 97 seated in a retaining socket in the base portion of the bracket 93 and acting forwardly against the pawl 95. The pawl may be pivotally supported by a cross pin 98 bridging the slot 94 and may be limited in its movement toward the ratchet teeth by a similar cross pin 99. The forward edge surfaces 100 of the bracket 93 slide into engagement with the instantaneously adjacent sloping surfaces 91 of the ratchet wheel to lock the work holding assembly against turning in one direction and, in the final locked position, shoulders 101 adjacent the edges 100 abut the associated shoulder surfaces 90 of the ratchet wheel so as to lock the work holding assembly against being turned in the opposite direction. Additionally, rearwardly stepped edge surfaces 102 of the bracket 93 slide into engagement with the radially outward ends of the ratchet teeth and tend to support the spindle 9 against bending movement rearwardly toward the chuck head at the portion of the spindle 9 which lies beyond the bearings 10 and 11.

It is not necessary for the pawl 95 (pawl nose 96a) to perform a complete 45° indexing movement of the head 32, although the pawl arrangement as shown will accomplish that degree of turning movement, because the surfaces 101 of the bracket 93 can be depended upon to perform the final indexing movement, bringing a sloping pawl face 91 into definite contact with the edge surfaces 100 of the bracket 93.

Because of the sliding contact of the edges 102 with the radially outward cylindrically formed ends of the ratchet teeth there is a possibility that when the slide 61 returns from the position shown in Fig. 2 to a position preparatory to indexing the ratchet wheel will be turned out of position in a reverse direction. Accordingly, and for other reasons to be explained presently, I provide a detent pawl on the bracket 7. The detent pawl is shown in the form of a plunger 105 acting at right angles to the axis of the ratchet wheel and preferably adjustably carried as on a bracket 106 supported at the side of the bracket 7 of the head 1. The detent pawl 105 has a slightly beveled surface 107 which, as the detent pawl moves to the position shown in Fig. 2, takes up any lost motion that may occur by reason of the edge surfaces 100 and 101 being slightly out of place with reference to the engaged faces of the ratchet wheel. Thus if the edge surface 101 does not come into full face abutment with a shoulder 90 of the ratchet wheel, the detent pawl 105 by reason of the beveled surface 107 camming into engagement with the adjacent shoulder 90 of the ratchet wheel will cause the sloping tooth face 91 adjacent the edge surfaces 100 to be maintained in locking contact with those edge surfaces.

In view of the disclosure of application Serial No. 488,171 it will be seen that the ratchet mechanism shown herein could be duplicated for indexing operation on the work supporting spindle assembly so that the slides 61 and 62 would each accomplish (e. g.) a 45° ratcheting of the work spindle assembly during each complete reciprocation of the two slides as through a distance such as indicated at D at the right of Fig. 2 and thus produce a 90° total indexing movement of the work at each full stroke. Such an arrangement, however, requires great precision in manufacture of chuck parts, particularly where the indexing and locking operations are performed on both spindles as shown in said application. Accordingly, in cases wherein both 45° and 90° indexing may be needed, as in so-called 45° fittings (braches 135° apart), it is a simple matter to change the throw of the shipper arm 85 and provide, in effect or actually, two pawls as by providing an additional pawl nose portion 96b on the pawl 95. Thus by simply reciprocating the slides as through the greater distance D' for each indexing operation of the slides, the work holding assembly is given 90° indexing movements.

The shipper arm mechanism would, of course, be provided with interchangeable rigid abutments (not shown) so that the desired ratcheting movements would be accomplished; and it is advisable to make the abutments adjustable in the direction that causes locking of the indexing mechanism hereof so that the edge surfaces 100 and 101 of the pawl supporting bracket will not be brought against the ratchet wheel surfaces with any more impact force than necessary to obtain full locking of the indexed work. Instead the slides or one of them could be adjustably limited to avoid a hammer blow on the ratchet wheel.

It is also to be understood that the ratchet mechanism may operate to turn the work holding assembly through angles other than 45° and 90°. Also the indexing may be performed first in one direction and then in the opposite direction as for working alternately on, for instance L-fittings, with a minimum of indexing time loss. A suitable ratchet pawl arrangement for such latter purpose is shown in my Patent 1,801,601.

For buttressing the head 30 of the spindle 8 against bending movement toward the chuck head where unsupported by the bearings 10 and 11 of the spindle 8, I provide a pair of rollers 110 as shown particularly at Figs. 1, 4 and 5. The rollers normally make light pressure line contact with the head 30 at a free turning peripheral portion thereof provided as by an outer race ring 111 of an ordinary antifriction bearing supported at a suitable shoulder on the head. The disposition of the buttressing rollers 110 with reference to the ring 111 is such that both rollers 110 may be maintained in forced contact with the ring 111 when the jaws are gripping the work and the work is locked against indexing movement. Assuming pressure contact of the rollers 110 against the ring 111 and thereby against the head 30, the head is prevented from moving sidewise in either direction upon bending of the spindle or looseness of its bearings as well as prevented from moving toward the rear of the chuck.

The rollers 110 are simply antifriction bearing assemblies supported as by pins 113 on a U-shaped bracket 114 having legs 115 embracing the sides of the bracket portion 6 of the head 1 and secured to the latter as by one or more screws 118 or other means at each side of the bracket 6. The legs 115 may have slots to receive the attaching screws so that the bracket portion 116 which supports the rollers can be adjusted toward and away from the rotational axis of the chuck for disposition of the rollers as close as practicable to the region of the work. To minimize bending moments in the supporting pins 113 of the rollers the pins are each supported at both ends as by provision of a tension plate 117 on the connecting or base portion of the U-shaped bracket, which plate carries one end of each supporting pin.

In order to secure forced buttressing engagement of the rollers 110 with the spindle head 30, the slide 62 carries a bar 118 thereon lengthwise of the slide member 62 and having two sets of relatively raised and depressed surface 119 and 120, respectively, so arranged that when the slide 62 moves to the position in which shown in Fig. 2 and the spindle mechanism is locked against rotation, the surfaces are brought by rolling contact to bear tightly against the rollers, thus buttressing the inward end of the spindle 8. During performance of the indexing operation, except possibly at completion thereof as will be evident, there is no force applied by the buttressing mechanism which could tend to make the spindle 8 hard to turn. Similarly, when the spindle plunger is being moved in and out during placement of work in the chuck, the buttressing force is relieved and the rollers will not drag endwise on any part of the head 30 of the spindle 8 because at such times the bar surfaces 119 are out of contact with the rollers 110.

Instead of providing a pair of rollers 110 intermediate the buttressing surfaces 119 and the bearing ring 111 of the spindle head bearing assembly, a single surface 119 may be provided in position to ride into rolling contact directly with the bearing ring 111 as the indexing operation is completed. That, however, would not accomplish resistance to sidewise bending of the unsupported end of the spindle.

An improvement in means for mounting the chuck jaws on the spindle ends consists in providing mating slightly diverging conical surfaces 121 and 122 between the jaws and associated spindle ends, across which conical surfaces and indenting the same, the usual driving key or tang 123 extends. Thus the jaw blocks are self-centering regardless of the amount of force applied tending to urge the jaws toward the associated spindles. The jaw blocks are mounted on the spindles as shown in Figs. 6 and 7 by center pins 125 and 126 which may be screw threaded into the spindle ends or otherwise secured.

In the work supporting jaw arrangement shown particularly by Figs. 1, 6 and 7, the jaw 31 is recessed as at 130 to receive a circular portion 131 of the work piece W and the jaw member 33 carries a generally spherical projection 133 (as on the jaw attaching center pin or screw 126). The spherical projection enters an already machined depressed surface 134 of the work piece so that the piece is definitely lined up in one direction with the axes of the spindles 8 and 9.

Assuming that the piece W is adequately aligned with the spindle axes as just described but that the arm portions 140 and 141 are not in proper orientation with the ratchet teeth of the head 32 such that when the arms 140 or 141 are presented to the tool on the turret, the arms themselves will be in proper position. True alignment with the tool may be secured by the floating pin and set screw arrangement shown particularly by Figs. 6 and 7. The set screw 142 extends at right angles to the spindle axis and in screw threaded relationship at 143 with an arm or bracket portion 144 of the jaw 33. The floating pins, indicated at 145, are mounted in the bracket portion 144 parallel to the screw and with their outer ends arranged for abutment by the head of the screw as at 146 and their inner ends for abutment with the arms 140 and 141 as at 147. With the arrangement shown, the piece may be inserted into position in and on the recess 130 and locating projection 133 without regard to the exact position of the arms 140 and 141 but, as a final operation, turning of the screw in the proper direction will cause the floating pins 144 and 145 to bear tightly against the respective arms of the piece and hold the piece with said arm in proper centered position for presentation to the tool.

While the spindle buttressing mechanism 110 etc. is shown operating upon the spindle head opposite that which is provided with indexing and anti-rotational locking means for the work holding spindle assembly generally, it is to be understood that said mechanism 110 etc. and the indexing and locking means can all operate upon the same work positioning spindle section or part thereof by appropriate re-design.

Also it is contemplated that the chuck opening and closing mechanisms hereby disclosed are not limited to use with non-stop indexing chucks, being applicable with or without modification to chucks wherein the indexing is performed upon stopping of the rotation and also to chucks which are not designed for indexing.

The work gripping jaw mounting arrangement according to Fig. 9 may be used interchangeably with the jaw mounting arrangement according to Fig. 7. When the head portion of the spindle, indicated at 32a in Fig. 9, is carrying a jaw block 33a locked against turning and buttressed against deflection out of place during performance of work on the gripped work piece, as by the mechanism herein disclosed, the cooperating head, 30a in Fig. 9, may support its jaw 31a in a full floating manner as by provision of a spherical seat 150 on the jaw block 31a and complementary spherical surface 151 on the head 30a. An attaching screw 152 for the jaw block 31a also has a head 153 provided with a spherical abutment 154 on its head portion which abutment is forced tightly against a complementary indented face of the block when the screw is seated. The bore and counterbore in the block 31a for receiving the screw 152 are made larger than adjacent portions of the screw. An eccentrically positioned key pin may bridge the block and head as at 158, the pin, as shown, extending loosely into a socket 159 of the head 30a for preventing the jaw block from being turned on the head 30a to an undesired position.

In a non-indexing chuck construction employing some of the principles hereof at least one rotary work supporting spindle (8 or 9) would be of advantage in effecting accommodation of one chuck block to work held in fixed (non-turning) position by a work receiving recess in the cooperating jaw block.

I claim:

1. An indexing chuck comprising a rotary head provided with work supporting means indexable on an axis extending at right angles to the rotational axis of the head, an indexing slide on the head, a ratchet wheel on the work supporting means, and plural indexing pawl means on the slide in spaced relation lengthwise thereof for selective indexing operations on the ratchet wheel different angular distances corresponding to different distances of reciprocation of the slide, and means for reciprocating the slide such different distances.

2. An indexing chuck according to claim 1 wherein said plural indexing pawl means are carried on a single pawl member and wherein a locking mechanism for the work supporting means operates to lock said means against rotation upon completion of successive indexing operations by said plural indexing pawl means.

3. In an indexing chuck, an indexable work support on an indexing axis transverse to the main rotational axis of the chuck, said support including separable parts relatively movable along said axis for receiving and gripping a work piece, a slide movable across the face of the chuck which is presented adjacent the work piece, a ratchet wheel on one element of the support, a ratchet pawl on the slide, means on the chuck operatable during rotation thereof and connected with the slide to cause indexing reciprocations of the same, the ratchet teeth and pawl being so arranged that the work support is turned through half the usual angular spacing at each complete reciprocation of the slide, and means operated by the slide for locking the work support against turning movement consequent upon each complete reciprocation of the slide whereby operations may be performed selectively on a work piece at the usual angular spacing and at half such angular spacing.

4. An indexing chuck comprising a rotary head provided with work supporting means indexable on an axis extending at right angles to the rotational axis of the head, two mutually adjacent slides on the forward face of the head behind the work supporting means and extending at right angles to the indexing axis, indexing means on one of the slides cooperating with the work supporting means to cause indexing movement thereof upon reciprocation of said one slide, said slides having slidably contacting surfaces cooperating to close the forward face of the head against entrance of chips and foreign matter, and means on the head operative to move the slides simultaneously in opposite directions.

5. In an indexing chuck, a work supporting spindle assembly disposed for indexing movement on an axis transverse to the axis of rotation of the chuck, a pair of mutually balancing slides mounted for relative reciprocating movement across the face of the chuck and transverse to the indexing axis of the support, indexing mechanism on one of the slides cooperating with indexing mechanism on the work support for step by step turning movement of the latter, mechanism on the chuck operatable during rotation thereof and arranged to move the slides always in opposite directions so that they tend to maintain balance of the chuck, said slides being arranged side by side on the chuck body and complementing each other to form a continuous chip-and-dirt-excluding wall across the central region of the chuck in all planes parallel to the rotational axis of the chuck and to the direction of reciprocation of the slides.

6. In an indexing chuck rotatable on a main working axis, a work holding assembly comprising relatively separable gripping jaws and respective spindles with spaced bearings on the front of the chuck aligned across said main axis, a slide on the chuck behind the spindle axes, means for reciprocating the slide crosswise of said spindle axes, and supporting means for the work holding assembly between the bearings, said supporting means being carried by the slide and arranged to be brought into and out of rolling supporting contact with said assembly on the rear side thereof as a result of reciprocation of said slide.

7. In a chuck, means for mounting work adjacent the rotational axis of the chuck, said means including a work supporting spindle and fixed bearing therefor transverse to said axis of the chuck, the work supporting end of the spindle having a portion overhanging the bearing toward said axis of the chuck, a slide on the chuck movable transverse to the spindle axis, and means rigidly carried by the slide and arranged to be brought by movement of the slide operatively into forced pressure rolling contact with said portion of the spindle to buttress the spindle when operatively in contact therewith and out of such contact to free the spindle for turning.

8. A chuck according to claim 7 wherein said means rigidly carried by the slide is a rail which makes operative rolling forced pressure contact with said portion of the spindle incident to movement of the slide.

9. A chuck according to claim 7 wherein said portion of the head has a free turning member thereon coaxial therewith constituting a roller for operative engagement with said means.

10. In a chuck, means for mounting work adjacent the rotational axis of the chuck and including a transverse work supporting spindle having a fixed bearing on the chuck in spaced relation to said rotational axis, a cylindrical head on the spindle inwardly from the bearing toward said axis and overhanging the bearing, two rollers in circumferentially spaced relation to each other about the cylindrical head on opposite sides of the axis of the spindle and rearwardly from said head, a slide on the chuck and means operated by the slide and operatively associated with the rollers to force them into buttressing contact with said cylindrical head.

11. In an indexing chuck, a work supporting spindle assembly having oppositely disposed bearing supports enabling indexing motion of the assembly transverse to the main rotational axis of the chuck, a pair of slides mounted on the chuck transverse to the indexing axis and generally centrally of the chuck, indexing means on one of the slides arranged to turn said assembly step by step during reciprocation of said slide, buttressing means on the other slide arranged to engage said assembly between the bearing supports to resist bending moment of said assembly during performance of operations on work carried on said assembly, and mechanism carried by the chuck operatable during rotation thereof and arranged simultaneously to move the slides in opposite directions for performing the indexing operation and removing and then re-establishing said buttressing engagement during each complete reciprocation of the two slides.

12. A chuck comprising a main rotary body having a rear end portion adapted to be attached to a lathe spindle or similar machine, relatively separable work supporting members on the chuck on an axis transverse to the rotational axis of the chuck, a cam adjacent said rear portion and adapted for operation through a hollow portion of such lathe spindle or similar machine, a rocker lever pivoted on the chuck having a forward arm connected to a movable work supporting member and a rearwardly extending arm, a push rod in operative contact with the rearwardly extending arm and the cam, the end of the push rod adjacent said rearwardly extending arm extending obliquely to the axis of the push rod whereby to increase pivotal movement of the rocker lever for a given reciprocating movement of the cam over such movement as the lever would have with such push rod end at right angles to the axis of the push rod.

13. Mechanism according to claim 12 wherein both ends of the push rod are oblique to the push rod axis and in the same general direction.

14. An indexing chuck comprising a rotary head provided with separable work supporting members, one of which is a plunger, a rocker lever extending longitudinally on the head and operatively engaging the plunger for movement thereof to enable placement of work in the chuck and gripping of the work, a cam centrally of the chuck reciprocable along said rotational axis, a push rod connecting the cam with the rocker lever, said push rod having a fixed maximum length and embodying yielding means by which said length can be yieldably diminished upon operation of the cam in a direction to move the work supporting members relatively toward each other.

15. Mechanism according to claim 14 wherein the push rod comprises two axially separable sections with a compression spring therebetween, one of said sections having a central portion extending into an axial bore of the other end secured to said other section by a cross pin in an axial slot of the latter section.

16. An indexing chuck comprising a rotary head provided with work supporting means indexable on an axis extending at right angles to the rotational axis of the head, a slide movable across the front face of the head, indexing means on the slide and cooperating indexing means on the work support, said means cooperating during reciprocating movement of the slide, a shiftable member guided on the head for movement parallel to said rotational axis and operable without stopping rotation of the chuck and a bell crank pivoted to the head and having arms occupying notches in said shiftable member and the slide for positively moving the slide in opposite directions.

17. An indexing chuck comprising a rotary head provided with work supporting means indexable on an axis extending at right angles to the rotational axis of the head, a slide movable across the front face of the head, indexing means on the slide and cooperating indexing means on the work support, said means cooperating during reciprocating movement of the slide, a shipper collar axially slidable on a rear portion of the head, a bar slidable in the same direction and mounted in an axially extending radial slot in the rear portion of the head, and a bell crank guided and supported for pivotal movement in said slot and positively connecting said bar and the slide for movement of the slide in opposite directions.

18. In an indexing chuck, a rotary head, relatively separable indexable spindles on the head at right angles to the axis of rotation of the head, a rocker lever on the head for effecting relative separation and bringing together of the spindles, mechanism operating on the rocker lever for movement of the spindles relatively together, a torsional spring having a pair of spaced coil portions and an intermediate loop in the form of an arm, said arm bearing against the rocker lever in a direction to cause relative separation of the spindles, a supporting pin rotatably mounted on the chuck head and extending through the coil portions of the spring and connected to relatively remote portions of the coils, and means on the head acting on the pin to lock the pin in various turned positions whereby to adjust the acting force of the arm constituting loop on the rocker lever.

19. In an indexing chuck, a pair of coaxial and axially spaced indexable spindles at right angles to the rotational axis of the chuck, means for indexing the spindles, and means for relatively separating or bringing the same relatively together along their common axis, work supporting jaws detachably carried on the relatively adjacent ends of the spindles, one of the jaws and the associated spindle having approximately conical adjacent surfaces for centering the jaw on the spindle, and driving key means intersecting the conical surfaces.

20. In an indexing chuck having a pair of indexable spindles relatively separable to receive work between them, grippers in fixed positions on the respective spindles, one of the grippers having an arm extending alongside a work piece disposed between the grippers, a pair of floating pins on said arm adapted to contact the work piece on opposite sides of the rotational axis of the chuck, and means on said arm operable simultaneously to force the pins into contact with the work piece.

21. Mechanism according to claim 20, wherein said means for operating the floating pins is a screw threaded to said arm and having a head arranged for abutment with both pins.

22. In a chuck mechanism, a rotary chuck head, work mounting jaw supporting devices on the head relatively movable in a direction transverse to the rotational axis of the chuck, means on the chuck connected with a movable one of said devices for causing such relative movement for receiving and gripping work pieces between the jaws, one of said devices having a generally spherical seat and the jaw carried thereby having a complementary surface engaging said seat, and jaw-attaching means holding the generally spherical surfaces in mutual abutment while enabling accommodating universal movement of the jaw so supported with reference to the other jaw.

23. In a rotary chuck, a pair of jaw mounting brackets, generally parallel to each other and on opposite sides of the axis of rotation of the chuck, a plunger slidably supported in one of said brackets and projecting inwardly toward said axis from the support afforded by the bracket, a slide on the chuck arranged for movement transverse to the movement of the plunger, means for operating the slide and means carried by the slide and operatively engageable with the inwardly projecting end of the plunger with rolling buttressing contact.

FRED HUNZIKER.